United States Patent
Koike et al.

(10) Patent No.: US 10,360,405 B2
(45) Date of Patent: Jul. 23, 2019

(54) ANONYMIZATION APPARATUS, AND PROGRAM

(71) Applicants: KABUSHIKI KAISHA TOSHIBA, Minato-ku (JP); TOSHIBA SOLUTIONS CORPORATION, Kawasaki-shi (JP)

(72) Inventors: Masanobu Koike, Tama (JP); Pakin Osotkraphun, Inagi (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 62 days.

(21) Appl. No.: 15/261,559

(22) Filed: Sep. 9, 2016

(65) Prior Publication Data

US 2016/0379011 A1 Dec. 29, 2016

Related U.S. Application Data

(63) Continuation of application No. PCT/JP2015/083767, filed on Dec. 1, 2015.

(30) Foreign Application Priority Data

Dec. 5, 2014 (JP) .................................. 2014-247369

(51) Int. Cl.
*G06F 7/04* (2006.01)
*G06F 17/30* (2006.01)
(Continued)

(52) U.S. Cl.
CPC ........ *G06F 21/6254* (2013.01); *G06F 16/285* (2019.01)

(58) Field of Classification Search
CPC ...................... G06F 21/6254; G06F 17/30598
(Continued)

(56) References Cited

U.S. PATENT DOCUMENTS

| | | | | |
|---|---|---|---|---|
| 2011/0178943 A1* | 7/2011 | Motahari | ............ | G06F 21/6254 705/325 |
| 2014/0172854 A1* | 6/2014 | Huang | ................ | G06F 21/6245 707/737 |
| 2014/0304244 A1* | 10/2014 | Toyoda | ............... | G06F 21/6254 707/696 |

FOREIGN PATENT DOCUMENTS

| | | |
|---|---|---|
| EP | 2228735 A2 | 3/2010 |
| JP | 2010-086179 A | 4/2010 |

(Continued)

OTHER PUBLICATIONS

M. Lichman, "UCI Machine Learning Repository (Adult)" https://archive.ics.uci.edu/ml/datasets/Adult, 2013, 1,386 Pages.
(Continued)

*Primary Examiner* — Brandon S Hoffman
*Assistant Examiner* — Samuel Ambaye
(74) *Attorney, Agent, or Firm* — Oblon, McClelland, Maier & Neustadt, L.L.P.

(57) ABSTRACT

According to one embodiment, an anonymization apparatus according to an embodiment is configured to execute a determination process, a division process, and a process of recursively executing at least the determination process and the division process, and to thereafter execute anonymization. A number-of-kinds calculation circuit calculates a number of kinds of different attribute values for each of a plurality of attributes, before the determination process is executed. A determination circuit determines the attribute to be noticed, based on also the calculated number of kinds. A
(Continued)

sort circuit sorts a plurality of personal data items, based on the calculated number of kinds, before the division process is executed.

6 Claims, 18 Drawing Sheets

(51) Int. Cl.
*H04N 7/16* (2011.01)
*G06F 21/62* (2013.01)
*G06F 16/28* (2019.01)

(58) Field of Classification Search
USPC .................................. 726/26; 707/757, 737
See application file for complete search history.

(56) References Cited

FOREIGN PATENT DOCUMENTS

| | | |
|---|---|---|
| JP | 2013-190838 A | 9/2013 |
| JP | 2013-200659 A | 10/2013 |
| JP | 2013-239118 A | 11/2013 |
| JP | 2014-106691 A | 6/2014 |

OTHER PUBLICATIONS

M. Lichman, "UCI Machine Learning Repository (Haberman's Survival)" https://archive.ics.uci.edu/ml/datasets/Haerman%27s+Survival, 2013, 10 Pages.

M. Lichman, "UCI Machine Learning Repository (Nursery)" https://archive.ics.uci.edu/ml/datasets/Nursery, 2013, 365 Pages.

M. Lichman, "UCI Machine Learning Repository (Census-Income)" https://archive.ics.uci.edu/ml/datasets/Census-Income+%28KDD%29, 2013, 95,749 Pages.

International Search Report dated Mar. 8, 2016 for PCT/JP2015/083767 filed on Dec. 1, 2015.

Written Opinion dated Feb. 25, 2016 for PCT/JP2015/083767 filed on Dec. 1, 2015.

Takao Takenouchi et al., "Combined Anonyrnization Considering Attackers in Data Holders", Japan Journal of Medical Information, Sep. 30, 2013 (Sep. 30, 2013), vol. 33, No. 3, pp. 127 to 138.

K. LeFevre, et al., "Mondrian Multidimensional K-Anonymity", IEEE Computer Society, 22nd International Conference on Data Engineering, 2006.

M. E. Nergiz, et al "Thoughts on k-Anonymization", Data & Knowledge Engineering, vol. 63, pp. 622-645, 2007.

\* cited by examiner

| 100a | Age | Gender | Address | Name of disease |
|---|---|---|---|---|
| Anonymization target | ○ | ○ | ○ | × |

FIG. 2

| 100b | Attribute value | |
|---|---|---|
| Attribute | Middle item | Small item |
| Gender | Person | Male |
| | | Female |

FIG. 3

| 100c | Attribute value | | |
|---|---|---|---|
| Attribute | Large item | Middle item | Small item |
| Address | Kanto | Tokyo | Minato-ku |
| | | | Fuchu-shi |
| | | | Ome-shi |
| | | | ... |
| | | Kanagawa | Yokohama-shi |
| | | | Kawasaki-shi |
| | | | ... |
| | | ... | ... |

| Attribute | Attribute value | | Corresponding value |
|---|---|---|---|
| | Middle item | Small item | |
| Gender | Person | Male | 0 |
| | | Female | 1 |

| Attribute | Attribute value | | | Corresponding value |
|---|---|---|---|---|
| | Large item | Middle item | Small item | |
| Address | Kanto | Tokyo | Minato-ku | 0 |
| | | | Fuchu-shi | 1 |
| | | | Ome-shi | 2 |
| | | | ... | ... |
| | | Kanagawa | Yokohama-shi | 3 |
| | | | Kawasaki-shi | 4 |
| | | | ... | ... |
| | | ... | ... | ... |

FIG. 6

|  | Age | Gender | Address | Name of disease |
|---|---|---|---|---|
| Number of kinds | 14 | 2 | 5 | — |
| Sort priority order | 1 | 3 | 2 | — |
| Attribute determination priority order | 3 | 1 | 2 | — |

Original data D

| Age | Gender | Address | Name of disease |
|---|---|---|---|
| 25 | Female | Yokohama-shi | Cold |
| 28 | Female | Yokohama-shi | Influenza |
| 26 | Male | Fuchu-shi | Influenza |
| 28 | Male | Fuchu-shi | Rubella |
| 32 | Male | Kawasaki-shi | Rubella |
| 32 | Male | Kawasaki-shi | Rubella |
| 33 | Male | Kawasaki-shi | Rubella |
| 37 | Female | Ome-shi | Cold |
| 38 | Female | Fuchu-shi | Stomachache |
| 43 | Female | Kawasaki-shi | Bone fracture |
| 44 | Female | Yokohama-shi | Influenza |
| 46 | Male | Minato-ku | Influenza |
| 49 | Male | Minato-ku | Diabetes |
| 52 | Male | Fuchu-shi | Cold |
| 54 | Male | Minato-ku | Diabetes |
| 55 | Male | Ome-shi | Stomachache |

Sort by "Age" ⇒

Sort data D1

| Age | Gender | Address | Name of disease |
|---|---|---|---|
| 25 | Female | Yokohama-shi | Cold |
| 26 | Male | Fuchu-shi | Influenza |
| 28 | Female | Yokohama-shi | Influenza |
| 28 | Male | Fuchu-shi | Rubella |
| 32 | Male | Kawasaki-shi | Rubella |
| 32 | Male | Kawasaki-shi | Rubella |
| 33 | Male | Kawasaki-shi | Rubella |
| 37 | Female | Ome-shi | Cold |
| 38 | Female | Fuchu-shi | Stomachache |
| 43 | Female | Kawasaki-shi | Bone fracture |
| 44 | Female | Yokohama-shi | Influenza |
| 46 | Male | Minato-ku | Influenza |
| 49 | Male | Minato-ku | Diabetes |
| 52 | Male | Fuchu-shi | Cold |
| 54 | Male | Minato-ku | Diabetes |
| 55 | Male | Ome-shi | Stomachache |

F I G. 10

Sort data D2

| Age | Gender | Address | Name of disease |
|---|---|---|---|
| 46 | Male | Minato-ku | Influenza |
| 49 | Male | Minato-ku | Diabetes |
| 54 | Male | Minato-ku | Diabetes |
| 26 | Male | Fuchu-shi | Influenza |
| 28 | Male | Fuchu-shi | Rubella |
| 38 | Female | Fuchu-shi | Stomachache |
| 52 | Male | Ome-shi | Cold |
| 37 | Female | Ome-shi | Cold |
| 55 | Male | Yokohama-shi | Stomachache |
| 25 | Female | Yokohama-shi | Cold |
| 28 | Female | Yokohama-shi | Influenza |
| 44 | Female | Yokohama-shi | Influenza |
| 32 | Male | Kawasaki-shi | Rubella |
| 32 | Male | Kawasaki-shi | Rubella |
| 33 | Male | Kawasaki-shi | Rubella |
| 43 | Female | Kawasaki-shi | Bone fracture |

Sort by "Gender" ⇒

Sort data D3

| Age | Gender | Address | Name of disease |
|---|---|---|---|
| 46 | Male | Minato-ku | Influenza |
| 49 | Male | Minato-ku | Diabetes |
| 54 | Male | Minato-ku | Diabetes |
| 26 | Male | Fuchu-shi | Influenza |
| 28 | Male | Fuchu-shi | Rubella |
| 52 | Male | Fuchu-shi | Cold |
| 55 | Male | Ome-shi | Stomachache |
| 32 | Male | Kawasaki-shi | Rubella |
| 32 | Male | Kawasaki-shi | Rubella |
| 33 | Male | Kawasaki-shi | Rubella |
| 38 | Female | Fuchu-shi | Stomachache |
| 37 | Female | Ome-shi | Cold |
| 25 | Female | Yokohama-shi | Cold |
| 28 | Female | Yokohama-shi | Influenza |
| 44 | Female | Yokohama-shi | Influenza |
| 43 | Female | Kawasaki-shi | Bone fracture |

F I G. 12

|  | Age | Gender | Address | Name of disease |
|---|---|---|---|---|
| Range of attribute values (Original data) | 30 | 2 | 5 | – |
| Range of attribute values (Received data) | 30 | 2 | 5 | – |
| Division degree | 1 | 1 | 1 | – |

Select "Gender" of highest rank in attribute determination priority order

F I G. 13

|  | Age | Gender | Address | Name of disease |
|---|---|---|---|---|
| Range of attribute values (Original data) | 30 | 2 | 5 | – |
| Range of attribute values (Received data) | 29 | 1 | 4 | – |
| Division degree | 0.97 | 0.5 | 0.8 | – |

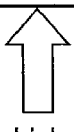

Select "Age" with highest division degree

F I G. 14

| Group | Age | Gender | Address | Name of disease |
|---|---|---|---|---|
| DL | 46 | Male | Minato-ku | Influenza |
| | 49 | Male | Minato-ku | Diabetes |
| | 54 | Male | Minato-ku | Diabetes |
| | 26 | Male | Fuchu-shi | Influenza |
| | 28 | Male | Fuchu-shi | Rubella |
| | 52 | Male | Fuchu-shi | Cold |
| | 55 | Male | Ome-shi | Stomachache |
| | 32 | Male | Kawasaki-shi | Rubella |

FIG. 15A

| Group | Age | Gender | Address | Name of disease |
|---|---|---|---|---|
| DR | 32 | Male | Kawasaki-shi | Rubella |
| | 33 | Male | Kawasaki-shi | Rubella |
| | 38 | Female | Fuchu-shi | Stomachache |
| | 37 | Female | Ome-shi | Cold |
| | 25 | Female | Yokohama-shi | Cold |
| | 28 | Female | Yokohama-shi | Influenza |
| | 44 | Female | Yokohama-shi | Influenza |
| | 43 | Female | Kawasaki-shi | Bone fracture |

FIG. 15B

| Group | | | | Age | Gender | Address | Name of disease |
|---|---|---|---|---|---|---|---|
| D | DL | DLL | DLLL | 26 | Male | Fuchu-shi | Influenza |
| | | | | 28 | Male | Fuchu-shi | Rubella |
| | | | DLLR | 32 | Male | Kawasaki-shi | Rubella |
| | | | | 46 | Male | Minato-ku | Influenza |
| | | DLR | DLRL | 49 | Male | Minato-ku | Diabetes |
| | | | | 54 | Male | Minato-ku | Diabetes |
| | | | DLRR | 52 | Male | Fuchu-shi | Cold |
| | | | | 55 | Male | Ome-shi | Stomachache |
| | DR | DRL | DRLL | 32 | Male | Kawasaki-shi | Rubella |
| | | | | 33 | Male | Kawasaki-shi | Rubella |
| | | | DRLR | 38 | Female | Fuchu-shi | Stomachache |
| | | | | 37 | Female | Ome-shi | Cold |
| | | DRR | DRRL | 25 | Female | Yokohama-shi | Cold |
| | | | | 28 | Female | Yokohama-shi | Influenza |
| | | | DRRR | 44 | Female | Yokohama-shi | Influenza |
| | | | | 43 | Female | Kawasaki-shi | Bone fracture |

F I G. 16

| Group | | | | Age | Gender | Address | Name of disease |
|---|---|---|---|---|---|---|---|
| D | DL | DLL | DLLL | 25-29 | Male | Fuchu-shi | Influenza |
| | | | | 25-29 | Male | Fuchu-shi | Rubella |
| | | | DLLR | 30-49 | Male | Kanto | Rubella |
| | | | | 30-49 | Male | Kanto | Influenza |
| | | DLR | DLRL | 45-54 | Male | Minato-ku | Diabetes |
| | | | | 45-54 | Male | Minato-ku | Diabetes |
| | | | DLRR | 50-59 | Male | Tokyo | Cold |
| | | | | 50-59 | Male | Tokyo | Stomachache |
| | DR | DRL | DRLL | 30-34 | Male | Kawasaki-shi | Rubella |
| | | | | 30-34 | Male | Kawasaki-shi | Rubella |
| | | | DRLR | 35-39 | Female | Tokyo | Stomachache |
| | | | | 35-39 | Female | Tokyo | Cold |
| | | DRR | DRRL | 25-29 | Female | Yokohama-shi | Cold |
| | | | | 25-29 | Female | Yokohama-shi | Influenza |
| | | | DRRR | 40-44 | Female | Kanagawa | Influenza |
| | | | | 40-44 | Female | Kanagawa | Bone fracture |

F I G. 17

| Age | Gender | Address |
|---|---|---|
| 0.069 | 0 | 0 |
| 0.069 | 0 | 0 |
| 0.483 | 0 | 0.25 |
| 0.483 | 0 | 0.25 |
| 0.172 | 0 | 0 |
| 0.172 | 0 | 0 |
| 0.103 | 0 | 0.25 |
| 0.103 | 0 | 0.25 |
| 0.034 | 0 | 0 |
| 0.034 | 0 | 0 |
| 0.034 | 0 | 0.25 |
| 0.034 | 0 | 0.25 |
| 0.103 | 0 | 0 |
| 0.103 | 0 | 0 |
| 0.034 | 0 | 0.25 |
| 0.034 | 0 | 0.25 |

Information loss amount L=0.085

F I G. 18

Case of k = 2

| Data [UCI machine learning repository] | Conventional mondrian method | Present embodiment | Ratio |
|---|---|---|---|
| Adult | 0.02688 | 0.02102 | 0.782 |
| Census-income (KDD) | 0.1543 | 0.1148 | 0.744 |
| Haberman's survival | 0.07553 | 0.06778 | 0.897 |
| Nursery | 0.1460 | 0.1233 | 0.845 |

F I G. 19

Case of k = 4

| Data<br>[UCI machine learning repository] | Conventional mondrian method | Present embodiment | Ratio |
|---|---|---|---|
| Adult | 0.06168 | 0.04633 | 0.751 |
| Census-income (KDD) | 0.2436 | 0.1654 | 0.679 |
| Haberman's survival | 0.1455 | 0.1301 | 0.894 |
| Nursery | 0.2585 | 0.2224 | 0.860 |

F I G. 20

Case of k = 8

| Data<br>[UCI machine learning repository] | Conventional mondrian method | Present embodiment | Ratio |
|---|---|---|---|
| Adult | 0.1099 | 0.07916 | 0.720 |
| Census-income (KDD) | 0.3304 | 0.2067 | 0.626 |
| Haberman's survival | 0.2409 | 0.2131 | 0.884 |
| Nursery | 0.3322 | 0.2989 | 0.900 |

F I G. 21

Case of k = 16

| Data<br>[UCI machine learning repository] | Conventional mondrian method | Present embodiment | Ratio |
|---|---|---|---|
| Adult | 0.1765 | 0.1223 | 0.693 |
| Census-income (KDD) | 0.4192 | 0.2486 | 0.593 |
| Haberman's survival | 0.3519 | 0.3141 | 0.893 |
| Nursery | 0.3988 | 0.3575 | 0.896 |

F I G. 22

Case of k = 32
| Data [UCI machine learning repository] | Conventional mondrian method | Present embodiment | Ratio |
|---|---|---|---|
| Adult | 0.2624 | 0.1812 | 0.691 |
| Census-income (KDD) | 0.5024 | 0.2966 | 0.590 |
| Haberman's survival | 0.4987 | 0.4413 | 0.885 |
| Nursery | 0.4708 | 0.4017 | 0.853 |
F I G. 23
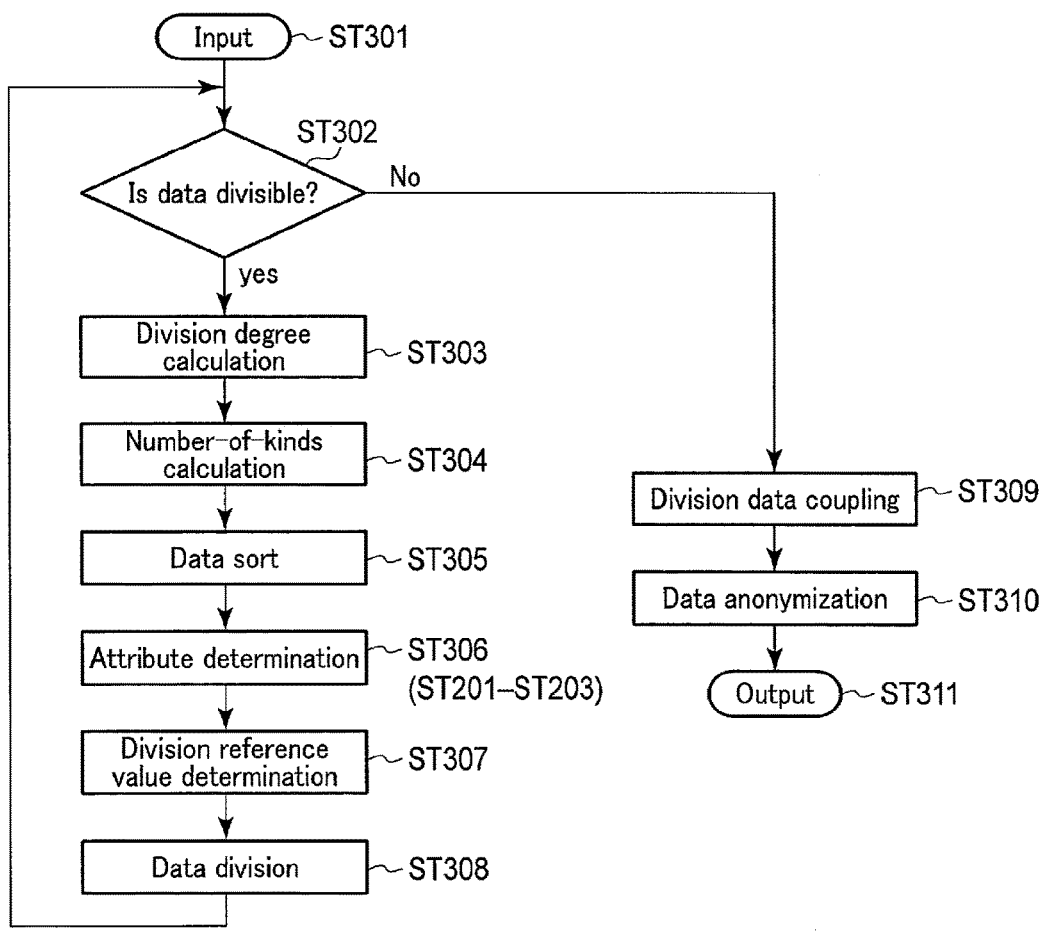
F I G. 24

| Age | Gender | Address | Name of disease |
|---|---|---|---|
| 25 | Female | Yokohama-shi | Cold |
| 28 | Female | Yokohama-shi | Influenza |
| 26 | Male | Fuchu-shi | Influenza |
| 28 | Male | Fuchu-shi | Rubella |
| 32 | Male | Kawasaki-shi | Rubella |
| 32 | Male | Kawasaki-shi | Rubella |
| 33 | Male | Kawasaki-shi | Rubella |
| 37 | Female | Ome-shi | Cold |
| 38 | Female | Fuchu-shi | Stomachache |
| 43 | Female | Kawasaki-shi | Bone fracture |
| 44 | Female | Yokohama-shi | Influenza |
| 46 | Male | Minato-ku | Influenza |
| 49 | Male | Minato-ku | Diabetes |
| 52 | Male | Fuchu-shi | Cold |
| 54 | Male | Minato-ku | Diabetes |
| 55 | Male | Ome-shi | Stomachache |

FIG. 25

| Age | Gender | Address | Name of disease |
|---|---|---|---|
| 25-29 | Male | Fuchu-shi | Influenza |
| 25-29 | Male | Fuchu-shi | Rubella |
| 32 | Male | Kawasaki-shi | Rubella |
| 32 | Male | Kawasaki-shi | Rubella |
| 25-34 | Person | Kanagawa | Rubella |
| 25-34 | Person | Kanagawa | Cold |
| 25-39 | Female | Kanto | Influenza |
| 25-39 | Female | Kanto | Cold |
| 45-49 | Male | Minato-ku | Influenza |
| 45-49 | Male | Minato-ku | Diabetes |
| 50-54 | Male | Tokyo | Cold |
| 50-54 | Male | Tokyo | Diabetes |
| 35-59 | Person | Tokyo | Stomachache |
| 35-59 | Person | Tokyo | Stomachache |
| 40-44 | Female | Kanagawa | Bone fracture |
| 40-44 | Female | Kanagawa | Influenza |

FIG. 26

| Age | Gender | Address |
|---|---|---|
| 0.069 | 0 | 0 |
| 0.069 | 0 | 0 |
| 0 | 0 | 0 |
| 0 | 0 | 0 |
| 0.276 | 1 | 0.25 |
| 0.276 | 1 | 0.25 |
| 0.310 | 0 | 0.25 |
| 0.310 | 0 | 0.25 |
| 0.103 | 0 | 0 |
| 0.103 | 0 | 0 |
| 0.069 | 0 | 0.25 |
| 0.069 | 0 | 0.25 |
| 0.586 | 1 | 0.25 |
| 0.586 | 1 | 0.25 |
| 0.034 | 0 | 0.25 |
| 0.034 | 0 | 0.25 |

Information loss amount L=0.196

F I G. 27

ANONYMIZATION APPARATUS, AND PROGRAM

CROSS-REFERENCE TO RELATED APPLICATIONS

This application is a Continuation Application of PCT application No. PCT/JP2015/083767, filed Dec. 1, 2015, and based upon and claiming the benefit of priority from Japanese Patent Application No. 2014-247369, filed Dec. 5, 2014, the entire contents of all of which are incorporated herein by reference.

FIELD

Embodiments of the present invention relate to an anonymization apparatus, and a program.

BACKGROUND

With the popularity of cloud-computing services, it has become possible to collect and store a great amount of data at low cost. As a result, the utilization of the collected data has become possible, and an activity of acquiring new knowledge and an activity of providing new services have been conducted.

In particular, by utilizing personal data including personal information, an attempt to acquire knowledge relating to the future trends of persons, and an attempt to provide detailed services for individual persons have vigorously been made. Therefore, it can be said that the personal data is data which is a particular target of utilization.

On the other hand, when personal data is utilized, it is required that careful attention be paid to the handling of the personal data so that privacy may not be invaded. The invasion of privacy means, for example, that an individual is identified from data, and thereby private information, which the identified individual does not want others to know about, leaks.

Thus, when personal data is utilized, use is made of anonymization techniques which make it difficult to understand whose personal information is the personal data that is to be utilized, thereby to avoid an invasion of privacy.

Among the anonymization techniques, attention has been paid to a k-anonymity method which executes anonymization such that personal data of at least a k-number of persons become identical information.

However, according to the inventor's study, the above-described k-anonymity method has the following problem.

In general, in the k-anonymity method, anonymization is realized by repeating data conversions, such as deletion and generalization, on given data. Thus, by executing k-anonymity, an amount of information included in original data is lost.

When an excessive amount of information is lost, a problem arises in that it is possible that the information obtained by analyzing k-anonymized data does not correctly reflect the information obtained by analyzing the original data. Specifically, if the information loss amount increases, it is possible that at a time of data utilizing, erroneous determination would be caused by deriving erroneous information, which does not correctly reflect the information obtained from the original data, from the information obtained by analyzing the k-anonymized data.

According to the inventor's study, it is estimated that the above-described problem can be avoided if the information loss amount can be decreased while data is k-anonymized.

The task of the invention is to provide an anonymization apparatus and a program, which can decrease an information loss amount, while data is k-anonymized.

BRIEF DESCRIPTION OF THE DRAWINGS

FIG. 2 is a schematic view illustrating an example of anonymization-target information in the embodiment.
FIG. 3 is a schematic view illustrating an example of attribute item information in the embodiment.
FIG. 4 is a schematic view illustrating an example of the attribute item information in the embodiment.
FIG. 5 is a schematic view illustrating an example of corresponding numerical value information in the embodiment.
FIG. 6 is a schematic view illustrating an example of the corresponding numerical value information in the embodiment.
FIG. 10 is a schematic view illustrating an example of sort in the embodiment.
FIG. 12 is a schematic view illustrating an example of sort in the embodiment.
FIG. 13 is a schematic view illustrating an example of a division degree calculation result in the embodiment.
FIG. 14 is a schematic view illustrating an example of the division degree calculation result in the embodiment.
FIG. 15A is a schematic view illustrating an example of data division in the embodiment.
FIG. 15B is a schematic view illustrating an example of the data division in the embodiment.
FIG. 16 is a schematic view illustrating an example of a data coupling result in the embodiment.
FIG. 17 is a schematic view illustrating an example of a data anonymization result in the embodiment.
FIG. 18 is a schematic view illustrating an example of a data loss amount evaluation result in the embodiment.
FIG. 19 is a schematic view illustrating an example of the data loss amount evaluation result in the embodiment.
FIG. 20 is a schematic view illustrating an example of the data loss amount evaluation result in the embodiment.
FIG. 21 is a schematic view illustrating an example of the data loss amount evaluation result in the embodiment.
FIG. 22 is a schematic view illustrating an example of the data loss amount evaluation result in the embodiment.
FIG. 23 is a schematic view illustrating an example of the data loss amount evaluation result in the embodiment.
FIG. 24 is a flowchart for describing an operation in a modification of the embodiment.
FIG. 25 is a schematic view illustrating an example of a plurality of general personal data.
FIG. 26 is a schematic view illustrating an example of general anonymized data.
FIG. 27 is a schematic view illustrating an example of a general information loss amount evaluation result.

DETAILED DESCRIPTION

In general, according to one embodiment, an anonymization apparatus is configured to execute a determination process of determining an attribute to be noticed during division, and a division reference value, with respect to a plurality of personal data items including attribute values of a plurality of attributes stored in a memory, a division process of dividing the plurality of personal data items into two groups, based on the division reference value, and a process of recursively executing at least the determination process and the division process on each of the groups, and to thereafter execute anonymization for each of the groups such that the personal data items in each of the groups become identical.

The anonymization apparatus includes a number-of-kinds calculation circuit, a sort circuit and a determination circuit.

The number-of-kinds calculation circuit calculates a number of kinds of different attribute values for each of the attributes, before the determination process is executed.

The sort circuit sorts the plurality of personal data items, based on the calculated number of kinds.

The determination circuit determines the attribute to be noticed, based on the calculated number of kinds and the sorted plurality of personal data items.

Figure 1:
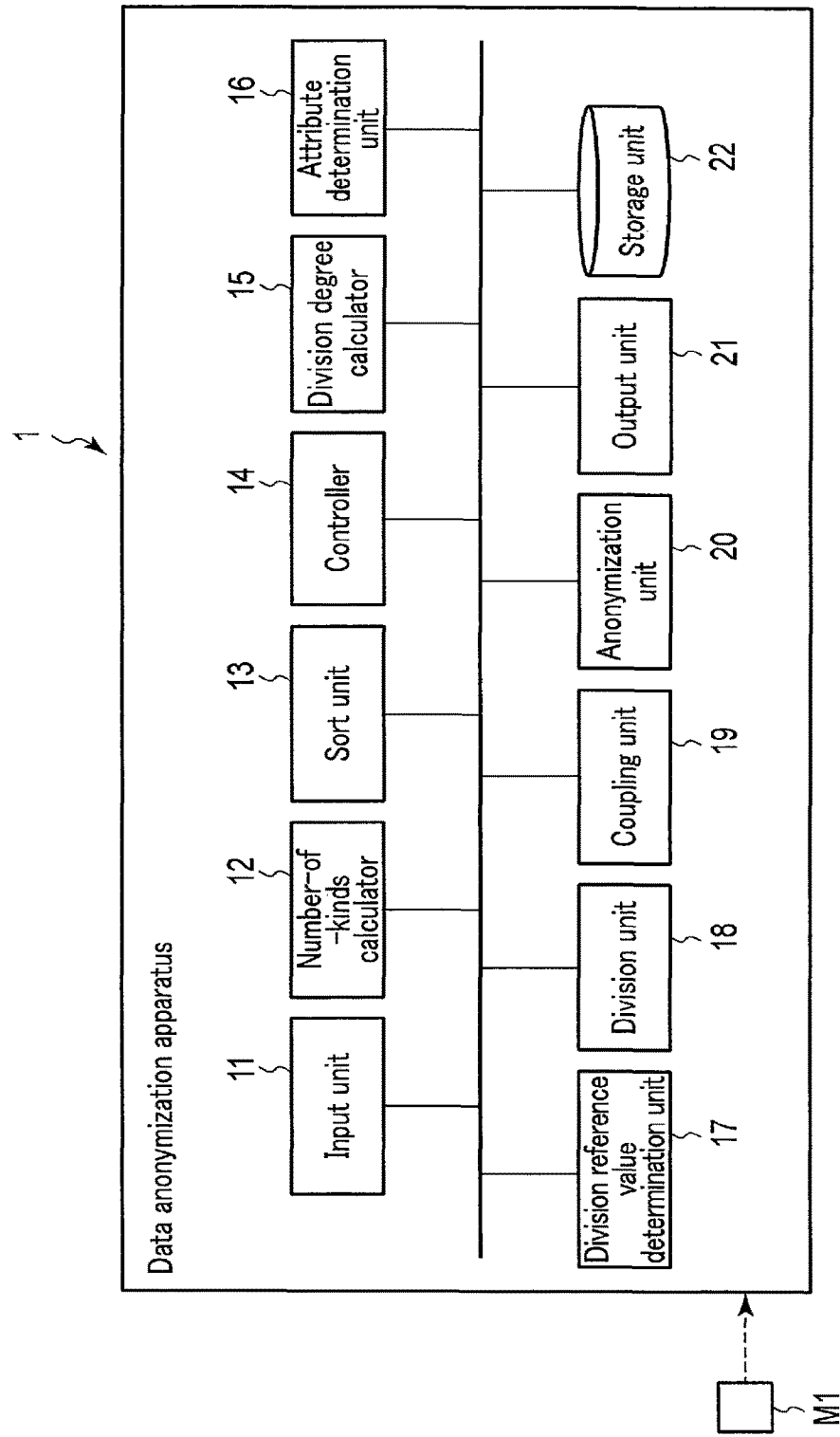
FIG. 1 is a block diagram illustrating a configuration example of an anonymization apparatus according to an embodiment.

Hereinafter, an embodiment is described with reference to the accompanying drawings. Before describing the embodiment, a description is given of a k-anonymity method and an evaluation thereof, which are generally used in the embodiment. In addition, an anonymization apparatus, which is used in the embodiment, can be implemented by a hardware configuration, or a combinational configuration of hardware resources and software. As the software of the combinational configuration, as illustrated in FIG. 1, use is made of a program which is installed in advance in each computer from a network or a non-transitory computer-readable storage medium M1, and causes each computer to realize the functions of the anonymization apparatus. Incidentally, the anonymization apparatus of the embodiment may be implemented as a stand-alone user terminal, or as a server apparatus in a client server system. Besides, the anonymization apparatus of the embodiment may be implemented as each of a plurality of process-executing devices which are selected at a low-load time in a cloud computing system such as a private cloud or a public cloud.

<k-Anonymity Method>

As one of methods of anonymizing personal data, there is known a k-anonymity method in which personal data of at least a k-number of persons are anonymized so as to become identical, so that individuals may not be identified from the anonymized personal data. As a method of this kind, for example, there is a method of a first document ([Mondrian]). Here, the information on the first document ([Mondrian]) is as follows.

[Mondrian] K. LeFevre, D J. DeWitt, R. Ramakrishnan, "Mondrian Multidimensional K-Anonymity", Proceedings of the $22^{nd}$ International Conference on Data Engineering, IEEE Computer Society, 2006.

In this method, the following processes (i) to (iii) are executed on personal data of a plurality of records including attribute values of a plurality of attributes stored in a memory. Then, with respect to each of groups, the personal data in each group are anonymized so as to become identical. Hereinafter, this method is also referred to as "Mondrian method".

(i) A determination process of determining an attribute which is to be noticed at a time of division, and a division reference value.

(ii) A division process of dividing personal data of plural records into two groups, based on the determined division reference value.

(iii) A process of recursively executing the determination process and the division process on each divided groups.

In the present embodiment, the personal data of plural records are k-anonymized by using this Mondrian method.

In the meantime, the unit of personal data including attribute values of plural attributes is "record". In the description below, "personal data of plural records" and "number of records of personal data" may be read as "plural personal data" and "number of personal data", respectively. In addition, the unit of a set of personal data composed of plural records is referred to as "group". Specifically, the "set of personal data composed of plural records" may be read as "group of personal data", or simply as "group".

Next, the algorithms of the k-anonymity by the Mondrian method is explained.

The basic model of the Mondrian method is composed of the following seven functions (hereinafter referred to as "algorithms"), namely divisibility/indivisibility determination, attribute determination, division reference value determination, division, recursive process control, coupling, and anonymization.

(Divisibility/Indivisibility Determination)

If plural personal data D are input, the divisibility/indivisibility determination algorithm outputs to the recursive process control algorithm a determination result as to whether the plural personal data D can be divided into two personal data groups DR and DL. The divisibility/indivisibility determination algorithm determines "divisible" if the number of records of the input plural personal data D is greater than 2k-1 with respect to a predetermined k. The division divisibility/indivisibility determination algorithm determines "indivisible" if the number of records of the input plural personal data D is not greater than 2k-1.

(Attribute Determination)

If the plural personal data D are input, the attribute determination algorithm determines an attribute A which is to be noticed at a time of dividing the plural personal data D, and outputs the attribute A to the division reference value determination algorithm and division algorithm.

(Division Reference Value Determination)

If the attribute A, which is to be noticed at the time of dividing the plural personal data D, is input, the division reference value determination algorithm determines a division reference value S, and outputs the division reference value S to the division algorithm.

(Division)

If the attribute A to be noticed and the division reference value S are input, the division algorithm divides the plural personal data D into a group RHS (Right Hand Side) which is greater than the division reference value S, and a group LHS (Left Hand Side) which is not greater than the division reference value S. Thereafter, the division algorithm outputs the groups RHS and LHS, which were obtained by the division, to the recursive process control algorithm.

In the description below, the group RHS and group LHS, which are obtained by dividing the plural personal data D, are referred to as "group DR" and "group DL", or "division data DR" and "division data DL", by adding reference signs "R" and "L" after reference sign "D" of the personal data D.

(Recursive Process Control)

If the divided groups DR and DL are input, the recursive process control algorithm inputs the groups DR and DL to the divisibility/indivisibility determination algorithm. Based on the divisibility/indivisibility determination result obtained for each group DR, DL, the recursive process control algorithm recursively outputs the group, which was determined to be divisible, to the attribute determination algorithm, and outputs the group, which was determined to be indivisible, to the coupling algorithm.

(Coupling)

The coupling algorithm operates if all groups, which were obtained by dividing the plural personal data D, are determined to be indivisible and all the groups, which were output to the coupling algorithm, have been input from the recursive process control algorithm. Specifically, the coupling algorithm associates and couples the personal data of all groups, which were input from the recursive process control algorithm, to the group into which each personal data was classified, and outputs coupled data D' to the anonymization algorithm.

(Anonymization)

If the coupled data D' is input, the anonymization algorithm anonymizes the coupled data D' such that the attribute values of each attribute in the personal data associated with the same group become identical content, and outputs anonymized data D".

By the above, the k-anonymity process by the Mondrian method is completed.

If the k-anonymity process is implemented by this Mondrian method with respect to k=2, general plural personal data D as illustrated in FIG. 25 are k-anonymized into anonymized data D" as illustrated in FIG. 26.

<Information Loss Amount Evaluation Method>

Next, a method of evaluating an information loss amount of k-anonymized data is described.

As the method of evaluating the information loss amount with respect to the k-anonymized data, there is known a method in which k-anonymity is implemented on test data, and information amounts before and after the k-anonymity are compared. As a method of this kind, there is a method described in, for example, a second document ([Loss Metric]). This method is also called "Loss Metric method". In this embodiment, the information loss amount of anonymized data D" for plural personal data D is evaluated by using the Loss Metric method.

In addition, as the test data which is used when k-anonymized data is evaluated by the Loss Metric method, there is, for example, data of a database ([UCI Machine Learning Repository]) which is made public for machine learning by the University of California, Irvine. This database ([UCI Machine Learning Repository]) is used as de facto standard test data at a time of evaluating k-anonymity. Here, the information on the second document ([Loss Metric]) and the database ([UCI Machine Learning Repository]) is as follows.

[Loss Metric] M. Ercan Nergiz, C. Clifton, "Thoughts on k-anonymization", Data & Knowledge Engineering, Vol. 63, pp. 622-645, 2007.

[UCI Machine Learning Repository (Adult)] Adult Data Set, https://archive.ics.uci.edu/ml/datasets/Adult

[UCI Machine Learning Repository (Census-Income)] Census-Income (KDD) Data Set, https://archive.ics.uci.edu/ml/datasets/Census-Income+%28KDD%29

[UCI Machine Learning Repository (Haberman's Survival)] Haberman's Survival Data Set, https://archive.ics.uci.edu/ml/datasets/Haberman %27s+Survival

[UCI Machine Learning Repository (Nursery)] Nursery Data Set, https://archive.ics.uci.edu/ml/datasets/Nursery Next, the calculation algorithm of the information loss amount by the Loss Metric method is explained. The information loss amount by the Loss Metric method is defined as follows.

$$l[i][j] = \frac{f(RT[i][j]) - 1}{g(PT_i) - 1}$$

$$L = \frac{\sum_{i=1}^{n} \sum_{j=1}^{m} l[i][j]}{mn}$$

Here, l[i][j] is an information loss amount at each attribute value of each personal data of the anonymized data D" ($0 \le l[i][j] \le 1$). An information loss amount L is an information loss amount which is obtained by averaging the information loss amounts l[i][j] of the respective attribute values in the entire anonymized data D" ($0 \le L \le 1$), and is also referred to as "information loss amount L of entire personal data".

In addition, when the anonymized data D" is expressed in a table format, each row of the table is referred to as "record", and each column of the table is referred to as "attribute". Symbol "m" is the number of records in the case in which the anonymized data D" is expressed in the table format, and "n" is the number of attributes in each personal data. The "number of attributes" may be referred to as "number of units of attributes" or "number of kinds of attributes".

RT[i][j] indicates an attribute value of an i-th attribute in a j-th record of the anonymized data D" expressed in the table format. In the meantime, the anonymized data D" is anonymized by k-anonymity such that personal data of at least k become identical, and the respective personal data, which have become identical content, are associated with the same group.

Symbol f(RT[i][j]) is a function which returns a natural number N1 if RT[i][j] is input. Here, the natural number N1 indicates the range of attribute values before anonymization of the attribute i in the group with which the RT[i][j] is associated. For example, when the attribute values are those of the attribute such as "age", which are expressed by numerical values, the range of attribute values is defined as a value obtained by adding "1" to the difference between the maximum value and minimum value in the group. In addition, when the attribute values are those of the attribute such as "address" or "gender", which are expressed by non-numerical values, the range of attribute values is defined as the number of units of attribute values in the case in which the same attribute value is counted as one.

Symbol $g(PT_i)$ is a function which returns a natural number N2 if $PT_i$ is input. Here, $PT_i$ indicates the attribute i in the anonymized data D". The natural number N2 indicates the range of attribute values relating to the attribute i in the data before anonymization of the anonymized data D".

By the above, the calculation process of the information loss amount by the Loss Metric method is completed.

When the information loss amount is evaluated by this Loss Metric method, the information loss amount l[i][j] of each attribute value for each personal data and the information loss amount L of the entire anonymized data D" in the general anonymized data D" as illustrated in FIG. 26 become as illustrated in FIG. 27.

As regards this information loss amount L, it is determined that the information loss amount is greater as the value of L becomes greater.

Embodiment

FIG. 1 is a schematic view illustrating a configuration example of an anonymization apparatus according to an embodiment. An anonymization apparatus 1 executes a determination process of determining, with respect to a plurality of personal data including attribute values of a plurality of attributes stored in a memory, an attribute which is to be noticed at a time of division based on a division degree calculated for each of the attributes, and further determining a division reference value; a division process of dividing the plural personal data into two groups, based on the determined division reference value; and a process of recursively executing at least the determination process and the division process on each group. Thereafter, the anonymization apparatus 1 executes anonymization for each of the groups such that personal data in each group become identical. This anonymization apparatus 1 includes an input unit 11, a number-of-kinds calculator 12, a sort unit 13, a controller 14, a division degree calculator 15, an attribute determination unit 16, a division reference value determination unit 17, a division unit 18, a coupling unit 19, an anonymization unit 20, an output unit 21, and a storage unit 22.

The input unit 11 accepts an input of a plurality of personal data D including attribute values of a plurality of attributes from the anonymization apparatus 1, and stores the plural personal data D in the storage unit 22. In addition, the input unit 11 sends the plural personal data D, the input of which was accepted, to the number-of-kinds calculator 12.

In the description below, the "plural personal data D, the input of which was accepted" may be read as "original data".

Here, the original data D includes attribute values of plural attributes as information relating to each individual. As the attributes, for example, "name", "gender" and "age" are used. Incidentally, the original data D are personal data which are a target of anonymization, and it is assumed that the original data D, after anonymized, will be immediately used for predetermined analysis. Accordingly, for example, when an attribute such as "name", which can directly identify an individual, is included in the input data, the input unit 11 may have a function of deleting this attribute. In addition, the input unit 11 may accept an input of personal data, from which unnecessary attributes were deleted, as the original data D.

In the meantime, as the original data D, use may be made of, for example, information of an itemized statement of medical expenses, which includes, on a person-by-person basis, the attribute values of the respective attributes such as "age", "gender", "address" and "name of disease". In this case, it is preferable that the "name of disease" is not anonymized, and the "age", "gender" and "address" are anonymized as needed and are used for predetermined analysis. Accordingly, as illustrated in FIG. 2, the attributes of the original data D may be classified in advance into anonymization-target attributes and non-anonymization-target attributes, and classification information indicating the result of classification may be prestored in the storage unit 22 as anonymization-target information 100a. In the example illustrated in FIG. 2, the attributes "age", "gender" and "address" are classified as anonymization-target attributes, and the attribute "name of disease" is classified as a non-anonymization-target attribute.

In addition, as illustrated in FIG. 3 and FIG. 4, the attribute values of each attribute may be classified in a hierarchical structure, for example, into a small item and a middle item in accordance with attribute values. Further, the classification information indicating the result of classification may be prestored in the storage unit 22 as attribute item information 100b, 100c for each attribute. Besides, the classification information with the hierarchical structure, such as the attribute item information 100b, 100c, may be used, at a time of anonymizing personal data, as information for anonymizing the attribute values of the attribute, by replacing an attribute value representing a lower-level item with an attribute value representing an upper-level item. Here, the attribute value representing the lower-level item is included in the attribute value representing the upper-level item.

The number-of-kinds calculator 12 receives the original data D from the input unit 11, and calculates a number-of-kinds $C_i$ of different attribute values for each attribute i. The number-of-kinds calculator 12 calculates each number-of-kinds $C_i$, before the attribute determination unit 16 and division reference value determination unit 17 execute determination processes. The number-of-kinds calculator 12 sends the original data D and each calculated number-of-kinds $C_i$ to the sort unit 13, and further sends each calculated number-of-kinds $C_i$ to the attribute determination unit 16.

Here, the number-of-kinds $C_i$ is the number of kinds of different attribute values, which is calculated by calculating identical attribute values as one kind, with respect to the attribute values in the attribute i in the personal data. In addition, the "number of kinds" may be referred to as "number-of-variations". The number-of-variations $C_i$ may be the number of units of mutually different attribute values among the attribute values in the attribute i.

In the meantime, the number-of-kinds calculator 12 may calculate, as a sort priority order, a priority order for each attribute i in the order beginning with the largest number-of-kinds $C_i$ which is calculated, and may associate the sort priority order and the number-of-kinds $C_i$ and send the associated result to the sort unit 13. In addition, the number-of-kinds calculator 12 may calculate, as an attribute determination priority order, a priority order for each attribute i in the order beginning with the smallest number-of-kinds $C_i$ which is calculated, and may associate the attribute determination priority order and the number-of-kinds $C_i$ and send the associated result to the attribute determination unit 16. Here, the relationship between the sort priority order and the attribute determination priority order is such a relationship that the priority orders calculated for each attribute i are reversed.

Furthermore, the number-of-kinds calculator 12 may read out the anonymization-target information 100a from the storage unit 22, and may calculate, based on the anonymization-target information 100a, the number-of-kinds $C_i$ of different attribute values for each anonymization-target attribute. In this case, the number of kinds and the priority order are not calculated for the non-anonymization-target attribute.

The sort unit 13 receives the original data D and the number-of-kinds $C_i$ in the original data D from the number-of-kinds calculator 12. The sort unit 13 sorts the original data D, based on the number-of-kinds $C_i$, before the division unit 18 executes the division process.

In addition, the sort unit 13 may receive the number-of-kinds $C_i$ in association with the sort priority order for each attribute from the number-of-kinds calculator 12, and may sort, based on the sort priority order, the original data D in the order beginning with the largest number of kinds for each attribute, and generate sort data Dn. Here, the sort data Dn is data obtained by the last n-th sort as a result of the execution of sort on an n-number of attributes. The sort unit 13 sends the sort data Dn to the controller 14.

In the meantime, the sort unit 13 may sort the original data D by an arbitrary sort method, for example, in an ascending order or a descending order. Incidentally, the sort unit 13 may execute sort for such attributes as "gender" and "address", whose attribute values are expressed by non-numerical values, on the basis of corresponding numerical value information 100d, 100e in which the respective attribute values of each attribute are associated with corresponding numerical values, as illustrated in FIG. 5 and FIG. 6. In this case, the corresponding numerical value information 100d, and 100e may be prestored in the storage unit 22, and the sort unit 13 may read out the corresponding numerical value information 100d, and 100e as needed, and may execute sort. In addition, as values of "corresponding numerical values", for example, values in the ascending order from "0" may be associated with the respective attribute values.

The controller 14 includes a control function for executing a process of recursively executing the calculation process which is executed by the division degree calculator 15, the determination processes which are executed by the attribute determination unit 16 and division reference value determination unit 17, respectively, and the data division process which is executed by the division unit 18. The controller 14 receives the sort data Dn from the sort unit 13, or receives plural personal data (hereinafter referred to as "division data") DR and DL, which were divided into groups, from the division unit 18, and determines whether division is possible or not. When it is determined that the original data D or the division data DR, DL is divisible, the controller 14 sends the original data D or division data DR, DL to the division degree calculator 15 in order to execute the recursive process. When it is determined that the original data D or division data DR, DL is indivisible, the controller 14 terminates the recursive process on the original data D or division data DR, DL, and sends the data to the coupling unit 19.

In the meantime, when the number of records of the received plural personal data D is greater than 2k−1, the controller 14 may execute the above recursive process. Here, k is an arbitrary natural number, and the set value of k corresponds to the minimum number of records of personal data, at which the attribute values of the anonymization-target attribute become identical content by anonymization. For example, when "2" is set for k, the controller 14 controls the recursive process such that personal data of at least two records become identical content by anonymization.

In addition, the controller 14 may also receive division data DRR, DRL, which is obtained by further dividing the division data DR into groups by the recursive process, and division data DLR, DLL, which is obtained by further dividing the division data DL. Incidentally, since the process relating to the division data DRR, DRL, DLR, DLL is the same as the process relating to the original data D and division data DR, DL, a description thereof is omitted. The same applies to the respective components to be described below.

The division degree calculator 15 receives the original data D or division data DR, DL, which were determined to be divisible, from the controller 14, and calculates a division degree $P_i$ for each attribute. The division degree calculator 15 sends the original data D or the division data DR, DL, and the calculated division degree $P_i$, to the attribute determination unit 16.

Here, the division degree $P_i$ is a ratio of the range of attribute values of the attribute i in the received plural personal data (division data DR, DL) to the range of attribute values of the attribute i in the original data D.

Here, the range of attribute values is a range in which attribute values in each attribute in plural personal data exist, and the calculation method of the range may differ in accordance with the nature of attribute values. For example, when the attribute is an attribute such as "age", whose attribute values are expressed by numerical values, the range of attribute values may be calculated as a value obtained by adding "1" to the difference between the maximum value and minimum value of the attribute values of the attribute. In addition, for example, when the attribute is an attribute such as "gender" or "address", whose attribute values are expressed by non-numerical values such as categories, the range of attribute values may be calculated as the number-of-kinds $C_i$ of attribute values.

In the meantime, even in the case of the attribute whose attribute values are expressed by non-numerical values, the division degree calculator 15 may give corresponding numerical values to the attribute values of the attribute whose attribute values are expressed by non-numerical values, and may thereby calculate the range of attribute values in the same method as in the case of the attribute whose attribute values are expressed by numerical values. Specifically, in the case of the attribute whose attribute values are expressed by non-numerical values, values of "corresponding numerical values" are given, in an ascending order from "0", to the attribute values of the attribute. Thereby, the range of attribute values in the attribute can be calculated as a value obtained by adding "1" to the difference between the maximum value and minimum value of the corresponding numerical values in the attribute.

When the division degree calculator 15 calculated the range of attribute values of each attribute with respect to the original data D, the division degree calculator 15 stores the range of attribute values of the original data D in the storage unit 22. The division degree calculator 15 reads out the range of attribute values of the original data D from the storage unit 22, and calculates, with respect to each attribute, the ratio of the calculated range of attribute values to the range of attribute values of the original data D, thus calculating the division ratio $P_i$.

The attribute determination unit 16 receives the number-of-kinds $C_i$ from the number-of-kinds calculator 12, and receives the original data D or the division data DR, DL, and the division degree $P_i$ from the division degree calculator 15. Based on the original data D or division data DR, DL and the division degree $P_i$, as well as the number-of-kinds $C_i$, the attribute determination unit 16 determines the attribute A which is to be noticed at the time of division. In addition, the attribute determination unit 16 may receive, from the number-of-kinds calculator 12, data in which the number-of-kinds $C_i$ is associated with the attribute determination priority order for each attribute, and may determine the attribute A to be noticed at the time of division, based on the attribute determination priority order.

Specifically, when a plurality of attributes with the maximum division degree exist, the attribute determination unit 16 determines, as the attribute A to be noticed, the attribute with the minimum number of kinds among the plural attributes, that is, the attribute of a highest rank in the attribute determination order. In addition, when a plurality of attributes with the maximum division degree do not exist, the attribute determination unit 16 determines the attribute with the maximum division degree as the attribute A to be noticed. The attribute determination unit 16 sends to the division reference value determination unit 17 the attribute A which is to be noticed at the time of division, and the original data D or the division data DR, DL.

In the meantime, in the case where a plurality of attributes with the maximum division degree exist and a plurality of attributes with the minimum number of kinds exist with respect to the plural attributes with the maximum division degree, the attribute determination unit 16 may determine an arbitrary attribute among the corresponding attributes as the attribute A to be noticed. In addition, among the corresponding attributes, an attribute of the leftmost column in the personal data may be determined as the attribute A to be noticed.

The division reference value determination unit 17 receives the attribute A to be noticed and the original data D or division data DR, DL from the attribute determination unit 16, and determines the division reference value S. The division reference value determination unit 17 sends to the division unit 18 the determined division reference value S, the attribute A to be noticed, and the original data D or division data DR, DL.

Here, the division reference value S is a central value of the number of records of the received personal data. Incidentally, the division reference value S may be a central value between the maximum value and minimum value of the attribute values in the attribute A to be noticed, or a value other than the central value, for example, a mean value or a mode value of attribute values of the attribute A to be noticed, and an arbitrary determination method may be applied.

The division unit 18 receives from the division reference value determination unit 17 the division reference value S, the attribute A to be noticed, and the original data D or division data DR, DL. The division unit 18 sorts the original data D or division data DR, DL with respect to the attribute A to be noticed. Based on the division reference value S, the division unit 18 divides the original data D or division data DR, DL, which was sorted with respect to the attribute A, into two groups, and obtains division data DR, DL or division data DRR, DRL, DLR, DLL. The division unit 18 sends the respective division data, which were divided into the two groups, to the controller 14.

In addition, the division unit 18 divides the original data D or division data DR, DL into two groups, based on whether personal data, among the plural personal data sorted with respect to the attribute A, has a number of records which is greater than the division reference value S, or personal data has a number of records which is not greater than the division reference value S. In the meantime, when the division reference value S was determined based on the attribute A, the division unit 18 may divide the original data D or division data DR, DL into two groups, based on whether personal data includes attribute values of the attribute A, the number of which is greater than the division reference value S, or personal data includes attribute values of the attribute A, the number of which is not greater than the division reference value S.

The coupling unit 19 receives the original data D or division data DR, DL, which was determined to be indivisible, from the controller 14.

When the coupling unit 19 received the original data D, the coupling unit 19 sends the original D to the anonymization unit 20. When the coupling unit 19 received the division data DR, DL, the coupling unit 19 may store division data DR, DL in the storage unit 22, until receiving division data of all the other groups relating to the original data D. In addition, when the coupling unit 19 received the division data of all the groups relating to the original data D, the coupling unit 19 may read out the stored division data DR, DL from the storage unit 22. After receiving the division data of all the groups relating to the original data D, the coupling unit 19 reads out the respective division data DR, DL from the storage unit 22 and couples the division data into one data, thus generating coupled data D'. In the meantime, the coupling unit 19 generates the coupled data D' by associating each personal data and a group to which the personal data belongs.

The anonymization unit 20 receives the original data D or coupled data D' from the coupling unit 19, anonymizes the original data D or coupled data D', and obtains anonymous data D". Specifically, when the anonymization unit 20 received the original data D, the anonymization unit 20 executes anonymization such that all personal data become identical content. In addition, when the anonymization unit 20 received the coupled data D', the anonymization unit 20 executes anonymization for each group in the coupled data D', such that the personal data in each group become identical content.

Additionally, the anonymization unit 20 may read out the attribute item information 100*b*, 100*c* from the storage unit 22, and may replace an item represented by each attribute value with an upper-level item, thereby executing anonymization of personal data. In the meantime, for example, in the case of the attribute such as "age" whose attribute values are expressed by numerical values, the anonymization unit 20 may execute anonymization by substituting an arbitrary range (e.g. in units of five years, or ten years) in which the attribute values in the group are included. In addition, aside from the above-described methods, the anonymization unit 20 can execute anonymization of attribute values by an arbitrary method, such as substituting a mean value or a mode value of the attribute values in the group.

Additionally, the anonymization unit 20 may read out the anonymization-target information 100*a* from the storage unit 22, and may not execute, based on the anonymization-target information 100*a*, anonymization with respect to the non-anonymization target attribute among the attributes in the coupled data D'. The anonymization unit 20 sends the anonymous data D" to the output unit 21.

The output unit 21 receives the anonymous data D" from the anonymization unit 20, and outputs the anonymous data D" to the outside of the anonymization apparatus 1.

The storage unit 22 is a readable/writable memory, and prestores the anonymization-target information 100*a*, attribute item information 100*b*, 100*c*, and corresponding numerical value information 100*d*, 100*e*. In addition, the storage unit 22 stores the original data D which was input to the input unit 11. Further, the storage unit 22 may store the division degree of each attribute with respect to the original data D, and may store division data which was determined to be indivisible. Besides, when all personal data relating to the original data D were determined to be indivisible, each stored division data in the storage unit 22 may be read out by the coupling unit 19.

Figure 7:
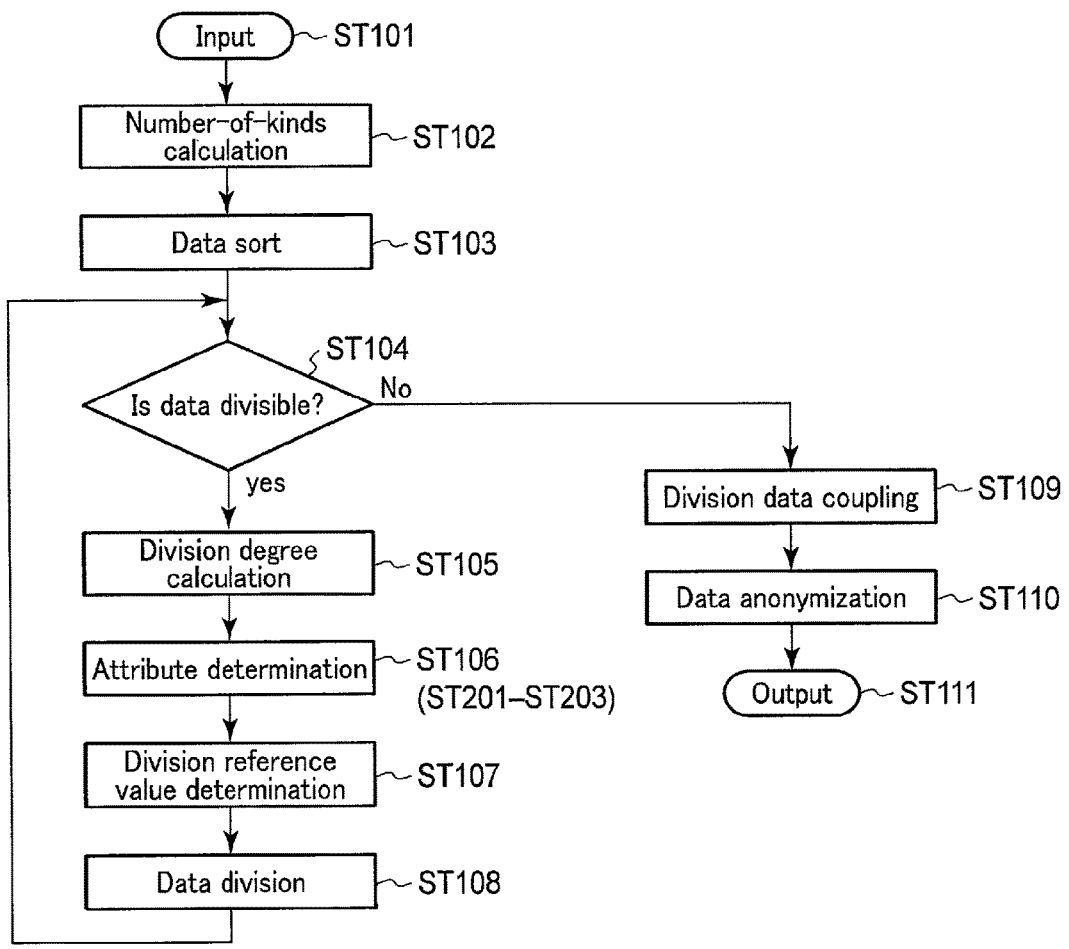
FIG. 7 is a flowchart for describing an operation example in the embodiment.

Next, the operation of the anonymization apparatus 1 having the above-described configuration is described with reference to flowcharts of FIG. 7 and FIG. 8. In the description below, it is assumed that the anonymization apparatus 1 receives, as an input, original data D as illustrated in FIG. 25, executes k-anonymity with k=2, and outputs anonymous data D". In addition, it is assumed that the storage unit 22 prestores the anonymization-target information 100*a* illustrated in FIG. 2, the attribute item information 100*b*, 100*c* illustrated in FIG. 3 and FIG. 4, and the corresponding numerical value information 100*d*, 100*e* illustrated in FIG. 5 and FIG. 6, and the respective components of the anonymization apparatus 1 execute anonymization processes based on each information. Furthermore, it is assumed that the sort unit 13 sorts attribute values in an ascending order, and the division reference value determination unit 17 determines the division reference value S as the central value of the number of records of personal data. Besides, when the anonymization unit 20 anonymizes the attribute "age", the anonymization unit 20 executes anonymization in units of five years with the units digit being 0~4 or 5~9, or, if no agreement is attained even in this case, executes anonymization in units of ten years with the units digit being 0~9 or 5~4.

To start with, the original data D is input from the outside to the input unit 11 (ST101). The input unit 11 stores the input original data D in the storage unit 22, and sends the input original data D to the number-of-kinds calculator 12.

The number-of-kinds calculator 12 calculates, with respect to the received original data D, the number-of-kinds $C_i$ of different attribute values for each attribute in the original data D (ST102). In the meantime, the number-of-kinds calculator 12 calculates the number-of-kinds $C_i$ of attribute values of each attribute, before the attribute A that is to be noticed at the time of division is determined.

In addition, the number-of-kinds calculator 12 calculates the sort priority order and attribute determination priority order, based on the calculated number-of-kinds $C_i$, associates them and sends the associated result to the sort unit 13 and attribute determination unit 16. The number-of-kinds calculator 12 further sends the original data D to the sort unit 13.

Figures 8, 9:
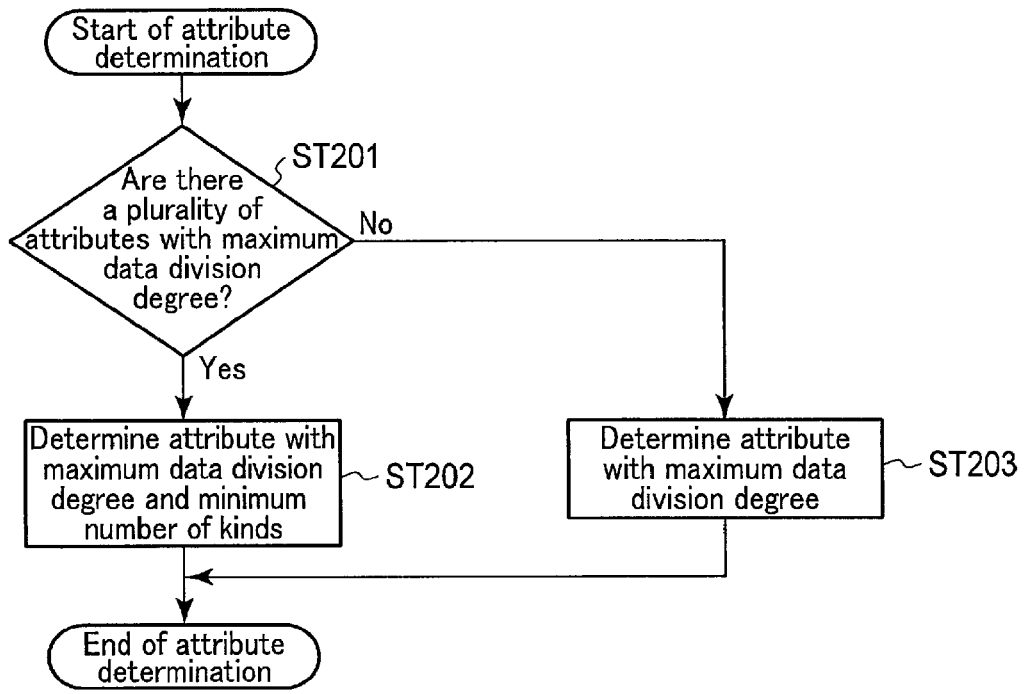
FIG. 8 is a flowchart for describing an operation example in the embodiment.
FIG. 9 is a schematic view illustrating an example of a number-of-kinds calculation result in the embodiment.

Specifically, the number-of-kinds calculator 12 reads out the anonymization-target information 100a from the storage unit 22, and calculates, as illustrated in FIG. 9, "14", "2" and "5" as the numbers-of-kinds $C_i$ of "age", "gender" and "address" which are anonymization-target attributes. In addition, the number-of-kinds calculator 12 calculates the sort priority order in the order of "age", "address" and "gender", which is the order beginning with the greatest number-of-kinds $C_i$, and calculates the attribute determination priority order in the order of "gender", "address" and "age", which is the order beginning with the least number-of-kinds $C_i$. Incidentally, the number-of-kinds calculator 12 does not calculate the number-of-kinds $C_i$ or each priority order with respect to the "name of disease" which is the non-anonymization-target attribute.

The sort unit 13 sorts the original data D, based on the received original data D, number-of-kinds $C_i$, and sort priority order (ST103).

Figure 11:
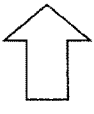
FIG. 11 is a schematic view illustrating an example of sort in the embodiment.

To begin with, as illustrated in FIG. 10, the sort unit 13 sorts the original data D with respect to the "age" which is the attribute of the first rank in the sort priority order, and obtains sort data D1. Next, as illustrated in FIG. 11, the sort unit 13 sorts the sort data D1 with respect to the "address" which is the attribute of the second rank in the sort priority order, and obtains sort data D2. At last, as illustrated in FIG. 12, the sort unit 13 sorts the sort data D2 with respect to the "gender" which is the attribute of the third rank in the sort priority order, and obtains sort data D3. In the meantime, in the case of the attributes such as "address" and "gender" whose attribute values are not numerical values, the sort unit 13 may read out the corresponding numerical value information 100d, 100e from the memory unit 22, and may execute sort by reading the corresponding numerical values for the respective attribute values.

The sort unit 13 sends the obtained sort data D3 to the controller 14.

The controller 14 determines whether the received sort data D3 is divisible or not (ST104). If it is determined that the sort data D3 is divisible (ST104; Yes), the controller 14 sends the sort data D3 to the division degree calculator 15 in order to execute the recursive process. If it is determined that the sort data D3 is indivisible (ST104; No), the controller 14 terminates the recursive process on the sort data D3, sends the sort data D3 to the coupling unit 19, and advances to step ST109. Here, since k-anonymity with k=2 is assumed, the sort data D3 is determined to be divisible.

The division degree calculator 15 calculates the division degree $P_i$ for each attribute with respect to the received sort data D3 (ST105). Specifically, as illustrated in FIG. 13, the division degree calculator 15 calculates the ratio of the range of attribute values in the received data to the range of attribute values in the original data D. In the meantime, when the attributes are "gender" and "address", the division degree calculator 15 reads out the corresponding numerical value information 100d, 100e from the memory unit 22, and calculates the ranges of attribute values, based on the corresponding numerical value information 100d, 100e. Incidentally, when the sort data D3 was input, as illustrated in FIG. 13, since the original data D and the received data D3 become identical, the division degree $P_i$ is calculated as "1" for any of the attributes.

If the division degree calculator 15 calculates the ranges of attribute values in the original data D, the division degree calculator 15 stores the ranges of attribute values in the storage unit 22. In addition, the division degree calculator 15 sends the calculated division degree $P_i$ and sort data D3 to the attribute determination unit 16.

Based on the received division degree $P_i$ and sort data D3 as well as the number-of-kinds $C_i$, the attribute determination unit 16 determines the attribute A which is to be noticed at the time of division (ST106). Specifically, the attribute determination unit 16 determines the attribute A to be noticed, in accordance with steps ST201 to ST203 illustrated in FIG. 8.

The attribute determination unit 16 determines whether a plurality of attributes with the maximum division degree exist (ST201). If the attribute determination unit 16 determines that a plurality of attributes with the maximum division degree exist (ST201; Yes), the attribute determination unit 16 determines, as the attribute A to be noticed, the attribute with the minimum number of kinds among the attributes with the maximum division degree (ST202). In addition, when a plurality of attributes with the maximum division degree for each attribute do not exist (ST201; No), the attribute determination unit 16 determines the attribute with the maximum division degree as the attribute A to be noticed (ST203).

In the meantime, when the sort data D3 was input, since a plurality of attributes with the maximum division degree exist, the attribute determination unit 16 advances to step ST202, and determines, among the attributes with the maximum division degree, the attribute "gender" with the minimum number of kinds as the attribute A to be noticed.

For example, as illustrated in FIG. 14, when the sort data D3, in which plural attributes with the maximum division degree do not exist, was input, the attribute determination unit 16 advances to step ST203, and determines the attribute "age" with the maximum division degree as the attribute A to be noticed.

The attribute determination unit 16 sends the "gender", which is the attribute A to be noticed, and the sort data D3 to the division reference value determination unit 17.

The division reference value determination unit 17 receives the "gender" that is the attribute A to be noticed, and sorts once again the sort data D3 with respect to the "gender"

of the sort data D3, thus obtaining sort data Df. Here, the sort data Df becomes the same result as the sort data D3. The division reference value determination unit 17 determines the division reference value S for the sort data Df (ST107). Specifically, the division reference value determination unit 17 determines a central value "8.5" of the number of records of the sort data Df as the division reference value S.

The division reference value determination unit 17 sends the division reference value "8.5" and the sort data Df to the division unit 18.

Based on the received division reference value "8.5", the division unit 18 divides the sort data Df into two groups (ST108). Specifically, the division unit 18 divides the sort data Df into a group DL, in which the number of records of sort data Df is greater than the division reference value "8.5", as illustrated in FIG. 15A, and a group DR, in which the number of records is not greater than the division reference value "8.5", as illustrated in FIG. 15B.

The division unit 18 sends the division data DR and DL obtained by the division to the controller 14.

The controller 14 determines whether the received division data DR, DL is divisible or not (ST104). Hereinafter, since the steps (ST104 to ST108) relating to the recursive process on the division data. DR, DL are the same operations as described above, a description thereof is omitted. As a result of the steps (ST104 to ST108) relating to the recursive process, the description of which is omitted, the recursive process on the sort data D3 is all terminated, and the process advances to step ST109.

As illustrated in FIG. 16, the coupling unit 19 couples all division data associated with the respective groups, and obtains coupled data D' (ST109). The coupling unit 19 sends the coupled data D' to the anonymization unit 20.

The anonymization unit 20 k-anonymizes the received coupled data D' (ST110). Specifically, as illustrated in FIG. 17, the anonymization unit 20 executes anonymization such that the personal data in each group become identical, with respect to each of the groups in the data of the coupled data D'. In the meantime, the anonymization unit 20 reads out the attribute item information 100b, 100c from the storage unit 22, and replaces an item represented by each attribute value with an upper-level item, thereby executing anonymization of personal data. Incidentally, the anonymization unit 20 reads out the anonymization-target information 100a from the storage unit 22, and does not execute anonymization of the non-anonymization-target attribute. The anonymization unit 20 sends the anonymous data D'' to the output unit 21.

The output unit 21 receives the anonymous data D'', and outputs the anonymous data D'' to the outside of the anonymization apparatus 1 (ST111).

Thereby, while k-anonymizing the plural personal data D, the anonymization apparatus 1 can output the anonymous data D'' in which the information loss amount is reduced. By analyzing the anonymous data D'' in which the information loss amount is reduced, the user can obtain an analysis result which correctly reflects information obtained by analyzing original personal data, while avoiding an invasion of personal privacy.

Specifically, an information loss amount l[i][j] of each attribute value for each personal data and an information loss amount L of the entire personal data in the original data D illustrated in FIG. 25 in the case of using the present embodiment are as illustrated in FIG. 18.

On the other hand, an information loss amount l[i][j] of each attribute value for each personal data and an information loss amount L of the entire personal data in the same original data D in the case of using the conventional method are as illustrated in FIG. 27. Compared to the information loss amount L=0.196 of the conventional method illustrated in FIG. 27, the information loss amount L=0.085 of the present embodiment illustrated in FIG. 18 shows that the information loss amount can be reduced by 50% or more.

In addition, the information loss amounts L in a case of k-anonymizing the four kinds of data of the database [UCI Machine Learning Repository] by using the present embodiment are evaluated by the Loss Metric method. The result of the evaluation shows that in the present embodiment, as illustrated in FIG. 19 to FIG. 23, the value of the information loss amount L becomes smaller, compared to the conventional Mondrian method, in each of cases of k=2, 4, 8, 16 and 32 for each data. For example, in FIG. 19 to FIG. 23, the ratios of the information loss amounts L of the present embodiment to the information loss amounts L of the conventional Mondrian method are all less than 1. Specifically, the present embodiment can obtain the result showing that the information loss amount can be reduced while the data is k-anonymized.

As has been described above, according to the present embodiment, the number of kinds of different attribute values for each attribute is calculated before executing the determination process of determining the attribute to be noticed at the time of division, and further determining the division reference value. In addition, the attribute to be noticed is determined based on the calculated number of kinds. Furthermore, the plural personal data are sorted based on the calculated number of kinds, before executing the division process of dividing the plural personal data into two groups, based on the reference value. Thereby, the information loss amount can be reduced while the data is k-anonymized.

If a supplementary description is given, the number of kinds for each attribute is calculated before executing the determination process. The plural personal data are sorted based on the number of kinds, before executing the division process, and the attribute to be noticed is determined based on the number of kinds. Thereby, at the time of division, it becomes easier to leave in the same group the records having close or identical attribute values of the attribute with a small number of kinds. Thereby, since the attribute values of the small number of kinds become identical information by anonymization, it becomes possible to prevent the information loss amount from greatly increasing.

Additionally, in the determination process, when a plurality of attributes with the maximum division degree exist, the attribute with the minimum number of kinds, among the attributes of the plural personal data, is determined as the attribute to be noticed. Furthermore, when a plurality of attributes with the maximum division degree do not exist, the attribute with the maximum division degree is determined as the attribute to be noticed. Thereby, the information loss amount can be reduced while the data is k-anonymized.

A supplementary description is given. By determining the attribute with a small number of kinds as the attribute to be noticed, it becomes easier to leave in the same group the records having close or identical attribute values of the attribute with the small number of kinds by the sort which is executed before the division by the division unit 18. Thereby, the attribute with the small number of kinds becomes identical information by anonymization, and it becomes possible to prevent the information loss amount from greatly increasing.

Additionally, the plural personal data are sorted in the order beginning with the attribute with the largest number of kinds which was calculated. Thereby, the information loss amount can be reduced while the data is k-anonymized.

A supplementary description is given. If the sort is executed in the order beginning with the attribute with the largest number of kinds, the attribute with the smallest number of kinds is sorted at last. It can be expected that at the time of sort, closer or identical values are arranged in the attribute with the small number of kinds than in the attribute with the large number of kinds. Thereby, the attribute with the small number of kinds of attribute values becomes identical information by anonymization, and it becomes possible to prevent the information loss amount from greatly increasing.

Additionally, the attributes are classified into anonymization-target attributes and non-anonymization-target attributes, and the attribute to be noticed is determined with respect to the attributes classified into the anonymization-target attributes. Thereby, k-anonymity can be executed by excluding attributes which need not be anonymized.

Additionally, the recursive process is executed when the number of records of plural personal data is greater than 2k−1. Thereby, when the plural personal data are divided, the personal data can be divided into groups of a minimum number of records with respect to an arbitrary number k.

Besides, the configuration, function, communication procedure, process procedure and process content of the anonymization apparatus can be variously modified and implemented without departing from the spirit of the invention.

For example, it should suffice if the number-of-kinds calculator 12 calculates each number-of-kinds $C_i$ before the attribute determination unit 16 and division reference value determination unit 17 execute determination processes. The number-of-kinds calculator 12 may be controlled by the controller 14 so as to recursively execute the process.

In addition, it should suffice if the sort unit 13 executes sort, before the division unit 18 executes the division process. The sort unit 13 may be controlled by the controller 14 so as to recursively execute the process.

Referring to a flowchart of FIG. 24, a description is given of an operation example at a time when the processes by the number-of-kinds calculator 12 and sort unit 13 are recursively executed in the above manner. Incidentally, it is assumed that the preconditions in this operation example are equal to those of the operation example based on the flowchart of FIG. 7.

To start with, if the original data D is input from the outside to the input unit 11 (ST301), the input unit 11 sends the input original data D to the controller 14.

The controller 14 determines whether the received original data D is divisible or not (ST302). If it is determined that the original data D is divisible (ST302; Yes), the controller 14 sends the original data D to the division degree calculator 15 in order to execute the recursive process. If it is determined that the original data D is indivisible (ST302; No), the controller 14 terminates the recursive process on the original data D, sends the original data D to the coupling unit 19, and advances to step ST309. Here, since k-anonymity with k=2 is assumed, the original data D is determined to be divisible.

The division degree calculator 15 calculates the division degree $P_i$ for each attribute with respect to the received original data D (ST303).

If the division degree calculator 15 calculates the ranges of attribute values in the original data D, the division degree calculator 15 stores the ranges of attribute values in the storage unit 22. In addition, the division degree calculator 15 sends the original data D to the number-of-kinds calculator 12, and sends the calculated division degree $P_i$ to the attribute determination unit 16.

The number-of-kinds calculator 12 calculates, with respect to the received original data D, the number-of-kinds $C_i$ of different attribute values for each attribute in the original data D (ST304). In the meantime, the number-of-kinds calculator 12 calculates the number-of-kinds $C_i$ of attribute values of each attribute, before the attribute A that is to be noticed at the time of division is determined.

In addition, the number-of-kinds calculator 12 calculates the sort priority order and attribute determination priority order, based on the calculated number-of-kinds $C_i$, associates them and sends the associated result to the sort unit 13 and attribute determination unit 16. The number-of-kinds calculator 12 further sends the original data D to the sort unit 13.

The sort unit 13 sorts the original data D, based on the received original data D, number-of-kinds $C_i$, and sort priority order, and obtains sort data D3 (ST305).

The sort unit 13 sends the obtained sort data D3 to the attribute determination unit 16.

Based on the received division degree $P_i$ and sort data D3 as well as the number-of-kinds $C_i$, the attribute determination unit 16 determines the attribute A which is to be noticed at the time of division (ST306). Specifically, the attribute determination unit 16 determines the attribute A to be noticed, in accordance with steps ST201 to ST203 illustrated in FIG. 8. Here, since steps ST201 to ST203 is the same as in the above-described operation example, a description thereof is omitted. In the meantime, when the sort data D3 was input, since a plurality of attributes with the maximum division degree exist, the attribute determination unit 16 advances to step ST202, and determines, among the attributes with the maximum division degree, the attribute "gender" with the minimum number of kinds as the attribute A to be noticed.

The attribute determination unit 16 sends the "gender", which is the attribute A to be noticed, and the sort data D3 to the division reference value determination unit 17.

The division reference value determination unit 17 receives the "gender" that is the attribute A to be noticed, and sorts once again with respect to the "gender" of the sort data D3, thus obtaining sort data Df. The division reference value determination unit 17 determines the division reference value S, based on the sort data Df (ST307). Specifically, the division reference value determination unit 17 determines "8.5", which is the central value of the number of records, "16", of the sort data Df as the division reference value S.

The division reference value determination unit 17 sends the division reference value "8.5", which was determined for the attribute "gender" to be noticed, and the sort data Df to the division unit 18.

Based on the received division reference value "8.5", the division unit 18 divides the sort data Df into two groups, and obtains division data DR and DL (ST308).

The division unit 18 sends the division data DR and DL obtained by the division to the controller 14.

Hereinafter, since the steps (ST302 to ST308) relating to the recursive process on the division data DR, DL are the same operations as described above, a description thereof is omitted. In addition, since the steps (ST309 to ST311) after the end of the recursive process are the same operation as the steps (ST109 to ST111) in the embodiment, a description thereof is omitted.

In this manner, in this modification, the processes by the number-of-kinds calculator 12 and sort unit 13 are controlled by the controller 14 so as to recursively execute the process.

Thereby, the number of kinds can be calculated in each recursive process, the sort can be executed based on the number of kinds calculated in each recursive process, and the information loss amount can be reduced when the data is k-anonymized.

In the meantime, the method that has been described in connection with the above embodiment may be stored as a computer-executable program in a storage medium such as a magnetic disk (e.g. a floppy (trademark) disk, a hard disk), an optical disk (e.g. a CD-ROM, a DVD), a magneto-optic disc (MO), or a semiconductor memory, and may be distributed.

Additionally, the storage form of this storage medium may be any form as long as the storage medium can store programs and is readable by a computer.

Additionally, an OS (operating system) running on a computer based on an instruction of a program installed from the storage medium into the computer, or MW (middleware), such as database management software or network software, may execute a part of each of processes for realizing the above embodiment.

Additionally, the storage medium in the embodiment is not limited to a medium which is independent from the computer, and includes a storage medium which stores or temporarily stores, by download, a program which is transmitted over a LAN or the Internet.

Additionally, the number of storage media in the embodiment is not limited to one. The configuration of the storage media in the invention includes such a case that the process in the above-described embodiment is executed from a plurality of media, and the configuration of the media may be any configuration.

Incidentally, the computer in the embodiment is a computer which executes each process in the embodiment, based on a program stored in the storage medium. The computer may have any configuration, for example, a configuration as a single apparatus such as a personal computer, or a configuration as a system in which a plurality of apparatuses are connected over a network.

Additionally, the computer in each embodiment is not limited to a personal computer, and is a general concept of equipment and apparatuses including an arithmetic processing apparatus included in information processing equipment, a microcomputer, etc., which can realize the functions of the invention by programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An anonymization apparatus configured to execute a determination process of determining, with respect to a plurality of personal data items including attribute values of a plurality of attributes stored in a memory, an attribute which is to be noticed during division based on a division degree calculated for each of the attributes, and further determining a division reference value, a division process of dividing the plurality of personal data items into two groups, based on the division reference value, and a process of recursively executing at least the determination process and the division process on each of the groups, and to thereafter execute anonymization for each of the groups such that the personal data items in each of the groups become identical, the anonymization apparatus comprising:

a number-of-kinds calculation circuit configured to calculate a number of kinds for each of the attributes, before the determination process is executed, the number of kinds being a numerical value calculated by counting the number of different attribute values in one attribute;

a determination circuit configured to determine the attribute which is to be noticed during the division process, based on also the calculated number of kinds; and a sort circuit configured to sort the plurality of personal data items, based on the calculated number of kinds, before the division process is executed.

2. The apparatus of claim 1, wherein the determination circuit is configured to determine, when a plurality of attributes with the calculated division degree, which is maximum, exist, the attribute with the calculated number of kinds which is minimum among the plurality of attributes, to be the attribute to be noticed, and to determine, when a plurality of attributes with the calculated division degree, which is maximum, do not exist, the attribute with the division degree, which is maximum, to be the attribute to be noticed.

3. The apparatus of claim 1, wherein the sort circuit is configured to sort the plurality of personal data items in an order beginning with the attribute with the calculated number of kinds which is maximum.

4. The apparatus of claim 1, wherein the attributes are classified in advance into anonymization-target attributes and non-anonymization-target attributes, and the number-of-kinds calculation circuit is configured to calculate the number of kinds of different attribute values for each of the anonymization-target attributes, before the determination process is executed.

5. The apparatus of claim 1, wherein the process of recursively executing is executed when a number of the plurality of personal data items is greater than 2k−1 (k being an arbitrary natural number).

6. A program stored in a non-transitory computer-readable storage medium, the program being executed by a processor of an anonymization apparatus configured to execute a determination process of determining, with respect to a plurality of personal data items including attribute values of a plurality of attributes stored in a memory, an attribute which is to be noticed during division based on a division degree calculated for each of the attributes, and further determining a division reference value for the attribute values of the attribute to be noticed, a division process of dividing the plurality of personal data items into two groups, based on the division reference value, and a process of recursively executing the determination process and the division process on each of the groups, and to thereafter execute anonymization for each of the groups such that the personal data items in each of the groups become identical, the program comprising:

a first program code which causes the anonymization apparatus to calculate a number of kinds of different attribute values for each of the attributes, before the determination process is executed, the number of kinds being a numerical value calculated by counting the number of different attribute values in one attribute;
a second program code which causes the anonymization apparatus to determine the attribute to be noticed, based on also the calculated number of kinds; and
a third program code which causes the anonymization apparatus to sort the plurality of personal data items, based on the calculated number of kinds, before the division process is executed.

* * * * *